Patented Jan. 30, 1934

1,945,501

UNITED STATES PATENT OFFICE 1,945,501

METHOD OF SEPARATING BORNEOL FROM PINE OIL

Irvin W. Humphrey, Wharton, N. J., assignor to Hercules Powder Company, Wilmington, Del., a corporation of Delaware No Drawing. Original application July 26, 1928, Serial No. 295,616. Divided and this application March 11, 1930. Serial No. 435,026

4 Claims. (Cl. 260—153)

My invention relates to the separation of certain components such as borneol, fenchyl alcohol, methyl chavicol, anethol and ketones from pine oil by means of selective dehydration combined with fractionation and refrigeration.

Pine oil, as is known, contains as components small proportions of terpenes and large amounts of certain oxygenated compounds including alpha-terpineol, anethol, fenchyl alcohol, methyl chavicol, borneol, ketones and small amounts of other substances. Of the components of high grade steam distilled pine oil, the terpineols amount usually to from 55%–70%, the exact percentage depending partly upon the amount of hydrocarbons present in the pine oil. The hydrocarbons boil about within the range 155°–187° C. and comprise chiefly pinene, dipentene and terpinolene. They represent from about 5%–20% of the pine oil and are readily separated in the low end by fractionating the pine oil.

If the hydrocarbons are separated from pine oil by fractionating, a residue is left which has a boiling range of about 195° C.–235° C. and comprises alpha-terpineol B. P. 218° C., a small proportion of other tertiary alcohols, fenchyl alcohol B. P. 202° C., borneol B. P. 212° C., methyl chavicol B. P. 216° C., anethol B. P. 233° C. and ketones. Since the terpineols are in preponderating proportion in pine oil and the other components are each in relatively small proportion, it has heretofore been impractical to readily separate such other components in high yield from the terpineols in a high degree of purity, and hence from one another, by the fractionation of pine oil, though such components are severally of substantial value.

Terpineols may comprise two-thirds of the pine oil; the various other oxygenated compounds, boiling within about the range 195–233° C., individually represent only about 2 to 10% of the pine oil. Thus, it is evident that removal of the terpineols from the pine oil will greatly facilitate the isolation of each of the other oxygenated constituents.

Now, it is the object of my invention to provide a method whereby the fenchyl alcohol, borneol, methyl chavicol, anethol and ketones may be separately recovered from the pine oil.

The method embodying my invention comprises the treatment of pine oil with hydriodic acid, which will be effective to partially chemically dehydrate the pine oil by selectively attacking the terpineols, breaking them down into water and hydrocarbons having a boiling range of about 170° C.–185° C., the other oxygenated components being effected, if at all, by the hydriodic acid to only a small extent. When the terpineols have been broken down into hydrocarbons and water, their separation, along with the hydrocarbons originally contained in the pine oil, from the other oxygenated components may be readily effected by fractionation of the pine oil, either simultaneously with the breaking down of the terpineols or subsequently. Since alpha-terpineol, B. P. 217–18° C., has been converted into hydrocarbons, B. P. largely 174–178° C., it is apparent that it may now be easily separated from the oxygenated components of the pine oil, all of which boil above about 195° C. The residue, which has a specific gravity of about 0.94 and boils largely between 190° C.–230° C., may then be readily fractionated, or fractionated and refrigerated, for the separate recovery of fenchyl alcohol, borneol, methyl chavicol, anethol and ketones.

As an example of the carrying out of the method embodying my invention, say 500 parts of pine oil are heated at a temperature of say 190° C.–225° C. for a period of say five hours with 2 parts of hydriodic acid, Sp. Gr. 1.5 and which contains approximately 50% of hydrogen iodide. The hydrocarbons, having a boiling range of about 170° C.–185° C. including those originally in the pine oil and those formed by the splitting off of water from the terpineols by the action of the hydrogen iodide, are then distilled off through a fractionating column. After distilling off the hydrocarbons there will remain a valuable residue amounting to about 130 parts, having a specific gravity of about 0.94, with the approximate boiling range: 5%—193° C., 20%—198° C., 50%—208° C., 70%—218° C., and 95%—230° C., which contails fenchyl alcohol, borneols, in substantial proportion, and methyl chavicol, anethol and ketones.

The amount of residue depends upon various factors including the composition of the original pine oil, temperature and time of dehydration, thoroughness of fractionation from hydrocarbons, etc. In case the pine oil is subjected to heating at too high a temperature, or for an excessive period, or if very large proportions of hydriodic acid are used, small amounts of high boiling polymerized hydrocarbons will be formed.

From the residue the high boiling polymerized hydrocarbons, if such are present, may be separated as a higher boiling residue and a refined distillate obtained, which will have a specific gravity of about 0.93, with the approximate boiling range: 5%—193° C., 20%—195° C., 50%—

201° C., 70%—207° C., and 90%—218° C., and from which fenchyl alcohol, borneol, methyl chavicol, anethol and ketones may be readily recovered by fractionation supplemented by refrigeration.

Previous dehydration, the pine oil may, if desired, be extracted with an aqueous solution of sodium bisulfite in order to remove traces of vanillin and other aldehydes, and then washed with aqueous sodium hydroxide, thus freeing it from small amounts of high boiling phenols.

For example, about 17 parts of crude borneol will separate on cooling the residue, obtained after distillation off of the hydrocarbons to 0° C. and may be filtered out of the residue. The remaining components of the residue may be separated by fractionation and refrigeration.

In carrying out the process in accordance with my invention, the pine oil to which hydriodic acid has been added may be refluxed and the hydrocarbons formed by dehydration of the terpineols subsequently distilled off, the residue being fractionated and refrigerated for the separation of its various components.

In carrying out my process, if desired, the pine oil may be distilled and the vapors thereof contacted with hydriodic acid, or the vapors of hydriodic acid may be passed into the pine oil, either before or during the heating of the pine oil, and the hydrocarbons and the desired oxygenated substances fractionally condensed, the desired oxygenated components being subsequently separated by fractionation and refrigeration, or the vapors may be all condensed together with subsequent removal of the hydrocarbons and fractionation of the residue for the desired compounds.

It will be understood that I do not intend that my invention shall be limited to the use of any particular amount of hydriodic acid nor to the use of any particular temperatures or periods of heating, as such may be varied without departing from my invention.

It will be noted that in accordance with my invention there is provided a relatively simple and inexpensive method by which the more valuable components of pine oil may be readily obtained therefrom in a high state of purity.

This application is filed as a division of the application for patent filed by me for improvement in method of separating certain components from pine oil, filed July 26, 1928, Serial No. 295,616 and which has resulted in United States Letters Patent No. 1,772,546.

What I claim and desire to protect by Letters Patent is:

1. The method of separating borneol from pine oil, which includes subjecting pine oil to the action of hydriodic acid and fractionating the treated pine oil for the separation of borneol.

2. The method of separating borneol from pine oil, which includes subjecting pine oil to the action of hydriodic acid, fractionating the pine oil for the separation of hydrocarbons, fractionating the residue to obtain a cut containing borneol and effecting the separation of borneol from the cut.

3. The method of separating borneol from pine oil, which includes heating pine oil in the presence of hydriodic acid, distilling off the hydrocarbons from the pine oil, fractionating the residue to obtain a cut containing borneol and effecting the separation of borneol from the cut.

4. The method of separating borneol from pine oil, which includes subjecting pine oil to the action of hydriodic acid, distilling the pine oil for the separation therefrom of hydrocarbons and fractionating the residue to effect separation of borneol.

IRVIN W. HUMPHREY.